US006242820B1

(12) United States Patent
Shankar et al.

(10) Patent No.: US 6,242,820 B1
(45) Date of Patent: *Jun. 5, 2001

(54) APPARATUS FOR PROVIDING A DIGITAL REPRESENTATION OF THE WEIGHT OF AN OBJECT

(75) Inventors: Pramod Shankar, Redlands; L. Dwight Gilger, Torrance; Carlton B. Ardery, Hermosa Beach; Barry Dunbridge, Torrance, all of CA (US)

(73) Assignee: TRW Inc., Redondo Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,779

(22) Filed: Oct. 9, 1998

(51) Int. Cl.⁷ ........................................................ B60L 1/00
(52) U.S. Cl. ........................... 307/10.1; 180/273; 280/735
(58) Field of Search ................................... 280/732, 735, 280/732.1, 734; 701/45, 46, 50; 177/136, 141, 177, 164; 340/436, 667; 180/273, 282; 307/10.1

(56) References Cited

U.S. PATENT DOCUMENTS

| | | | | |
|---|---|---|---|---|
| 4,842,085 | * | 6/1989 | Lang | 177/164 |
| 5,232,243 | * | 8/1993 | Blackburn et al. | 280/732 |
| 5,454,591 | * | 10/1995 | Mazur et al. | 280/735 |
| 5,474,327 | * | 12/1995 | Schousek | 280/735 |
| 5,563,458 | | 10/1996 | Ericson . | |
| 5,732,375 | * | 3/1998 | Cahsler | 701/45 |
| 5,864,295 | * | 1/1999 | Jarocha | 340/667 |
| 6,012,007 | * | 1/2000 | Fortune et al. | 701/45 |

* cited by examiner

Primary Examiner—Josie Ballato
Assistant Examiner—Sharon Polk
(74) Attorney, Agent, or Firm—Michael S. Yatsko

(57) ABSTRACT

Apparatus for sensing the weight of an object and providing a digital representation of a weight range within which the sensed weight falls, and apparatus for controlling the deployment of a vehicular air bag in accordance with the weight of a passenger seated in a vehicle seat adjacent the air bag. A number of two-position switches 28 normally assume a first position and are responsive to a force of at least a predetermined amount to assume a second position. The first position represents a first weight range, and the second position represents a second weight range. A support surface 58, 60 overlies the switches to support an object to be weighed. A decoding circuit 30 monitors the positions of each of the two-position switches and provides a digital representation of the weight range within which the weight of the object falls. In the vehicular air bag system, a number of groups of the two-position switches 28 are mounted in a passenger seat 52 adjacent the air bag. Each group includes switches which assume their second position in response to a force of at least a predetermined amount that is associated with such group. The decoding circuit 30 provides a digital representation of the weight range within which the weight of a passenger seated in the passenger seat falls. A controller is responsive to the decoding circuit to control the air bag deployment system to control deployment of the air bag 48 in accordance with the represented weight range.

29 Claims, 5 Drawing Sheets

APPARATUS FOR PROVIDING A DIGITAL REPRESENTATION OF THE WEIGHT OF AN OBJECT

BACKGROUND OF THE INVENTION

The present invention pertains to an apparatus for sensing the weight of an object and providing a digital representation of a weight range within which the sensed weight falls. Further, the present invention pertains to an apparatus for controlling the deployment of a vehicular air bag in accordance with the weight of a passenger seated in a vehicle seat adjacent the air bag.

In various applications it is desirable to obtain an approximation of the weight of an object. It may only be necessary that the object's weight be indicated to be within a weight range; the exact weight of the object not being required. By way of example, vehicular air bag systems sense an impact and deploy an air bag to protect a passenger from contact with the windshield, dashboard, or other parts of the vehicle interior. However, different restraining forces are appropriate for passengers of different sizes. Thus, for example, the air bag restraining force necessary to protect a 300 pound man is considerably greater than that necessary to protect a 50 pound child. Numerous injuries, and even deaths, have occurred due to a vehicular air bag deploying with such great force that it injures or kills the passenger it is intended to protect.

SUMMARY OF THE INVENTION

In one aspect, the present invention is an apparatus for sensing the weight of an object and providing a digital representation of a weight range within which the sensed weight falls. The apparatus includes a plurality of two-position switches, each of which normally assumes a first position and is responsive to a force of at least a predetermined amount to assume a second position. The force required to cause the switch to assume the second position defines two weight ranges. The switches are positioned beneath a support surface which supports the object to be weighed. A decoding circuit monitors the position of each of the switches to provide a digital representation of the weight range within which the weight of the object falls. By way of example, the two-position switches might be dome shaped switches of the type disclosed in U.S. Pat. No. 5,563,458. Alternatively, any other suitable two-position switch that is responsive to a force of at least a predetermined amount might be utilized.

In a second aspect, the present invention is a plurality of groups of two-position switches, each group being responsive to force of a uniquely associated amount to give each group of switches a uniquely associated first weight range and a uniquely associated second weight range.

A third aspect of the present invention is a vehicular air bag system including an air bag, an air bag deployment system, an impact sensor for activating the air bag deployment system to deploy the air bag upon sensing of an impact of at least a predetermined magnitude, and an apparatus for sensing the weight of a passenger seated in a seat adjacent the air bag and controlling the air bag deployment system to control deployment of the air bag in accordance with the weight of the passenger weight.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals., In the drawings:

DETAILED DESCRIPTION OF PREFERRED EMBODIMENTS

Figure 1:
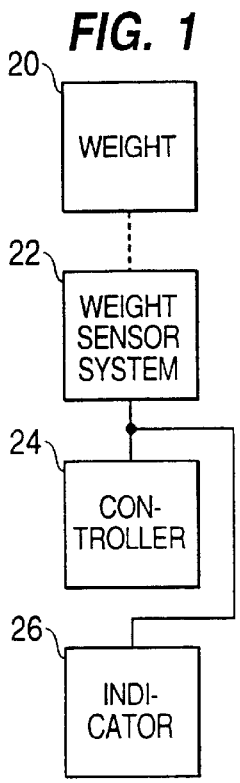
FIG. 1 is a block diagram of an apparatus in accordance with a preferred embodiment of the present invention for sensing the weight of an object and providing a digital representation of a weight range within which the sensed weight falls.

In FIG. 1 a weight 20 to be sensed is supported on a weight sensor system 22 so as to obtain a digital representation of a weight range within which the weight 20 falls. Weight sensor system 22 can provide this digital representation to a controller 24 for controlling a weight-dependent process or to an indicator 26 to provide an indication of the weight range, or to both.

Figure 2:
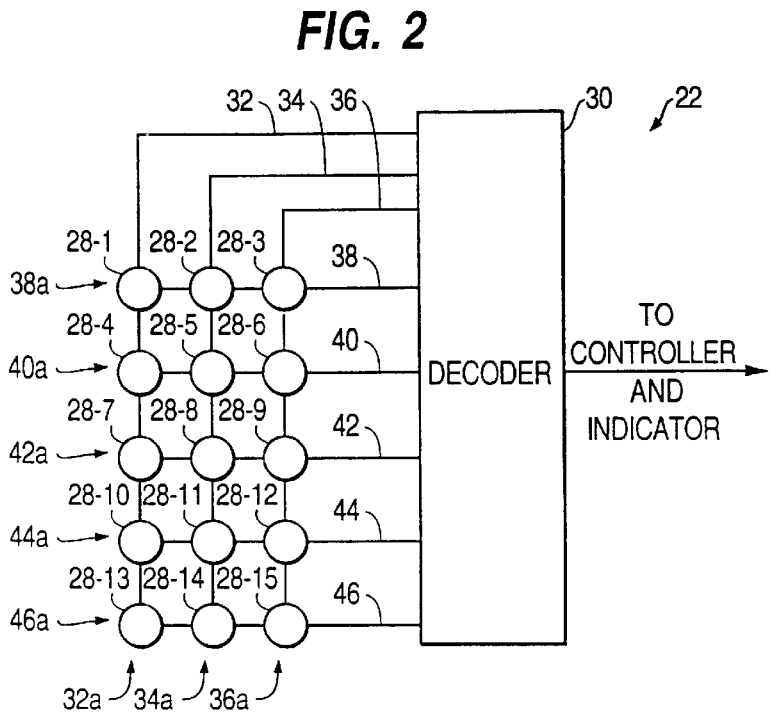
FIG. 2 is a block diagram of a weight sensor system in accordance with an embodiment of the present invention suitable for incorporation into the apparatus of FIG. 1.

FIG. 2 presents an illustrative form of a suitable weight sensor system 22, including a plurality of two-position switches 28 and a decoder 30. In the illustrative weight sensor system of FIG. 2, the two-position switches 28 are arranged in an array of columns 32a, 34a, and 36a, and rows 38a, 40a, 42a, 44a and 46a. Each column 32a, 34a, 36a of two-position switches 28 is connected by a corresponding switch input line 32, 34, 36 from decoder 30. Similarly, each row 38a, 40a, 42a, 44a, 46a of switches 28 is connected to decoder 30 by a corresponding switch output line 38, 40, 42, 46.

In the illustrative weight sensor system depicted in FIG. 2, each row 38a–46a of switches 28 includes three switches.

In FIG. 2, the three switches of row 38a are designated as switches 28-1, 28-2, and 28-3. The three switches of the remaining rows 40a–46a are similarly numbered through switches 28-13, 28-14, and 28-15 of row 46a. Decoder 30 can include a multiplexer as disclosed in FIGS. 5 and 6 of U.S. Pat. No. 5,563,458, to apply a voltage in turn to each of the switch input lines 32, 34, 36 to enable each column of switches 32a, 34a, 36a in turn. During the time any one column 32a–36a of the switches 28 is enabled, decoder 30 samples each switch output line 38–46 in turn so as to sense in turn the condition of each of the three switches in each of the associated rows 38a–46a. Thus, for example during the time that voltage is applied to switch input line 34, each switch output line 38–46 is monitored to determine the states of the switches 28-2, 28-5, 28-8, 28-11 and 28-14 that are in column 34a.

Each of the two-position switches 28 is a switch which normally assumes a first position but is responsive to force of at least a predetermined amount to assume a second position. The force that is required to cause each of the switches 28-1 through 28-15 to change from its first position to its second position can be identical for each of the switches, can be identical for each switch within a group of the switches, or can be different for each of the switches. Thus, if only two weight ranges are to be distinguished, each switch 28-1 through 28-15 can have the same force sensitivity. If the weight of a small object which might apply force to a single one of the switches is to be determined, then each of the switches can have a sensitivity corresponding with that weight. If the weight of a larger object is to be sensed, then the switches can have a sensitivity such that the weight to be distinguished causes at least a predetermined number of those switches to change position. Then, if the output applied by the switches to decoder 30 indicates that fewer than that number of switches has changed position, decoder 30 determines that the weight of the object is in the lower weight range, while if the output indicates that at least the predetermined number has changed state, then decoder 30 determines that the weight is in the higher weight range.

Alternatively, the switches 28-1 through 28-15 can be divided into groups of differing sensitivities. Thus, for example, switches 28-1, 28-4, 28-7, 28-10, and 28-13 of column 32a can have a first force sensitivity so that they change state in response to a force of at least a first predetermined amount, while the switches of column 34a have a second force sensitivity, and the switches of column 36a have a third force sensitivity. The weight sensor system 22, then, would distinguish between four weight ranges, namely less than a weight W1, greater than weight W1 but less than a weight W2, greater than weight W2 but less than a weight W3, and greater than weight W3. Any number of weight ranges might be provided. The illustrative example of FIG. 2 could distinguish 16 weight ranges if each of the switches 28-1 through 28-15 has a different force sensitivity.

Decoder 30 decodes the outputs of the switches 28-1 through 28-15 to provide a digital representation of the weight range within which the sensed weight falls. Decoder 30 could include an appropriate gate matrix for this purpose. Decoder 30 provides this digital representation to controller 24 and indicator 26. Controller 24 controls a weight sensitive process in accordance with the detected weight range, while indicator 26 provides an indication of the weight range. If only two weight ranges are being distinguished, indicator 26 could be a light which is turned off to indicate one weight range and turned on to indicate the other. Alternatively, indicator 26 could provide a numerical indication of the weight range or any other type of indication, as desired.

Figure 3:
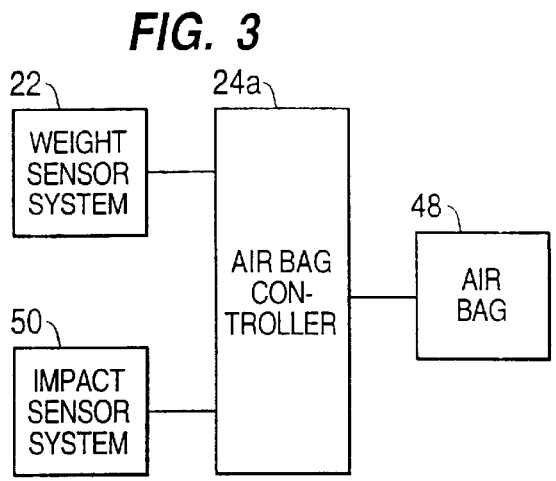
FIG. 3 is a block diagram of a first embodiment of a vehicular air bag system in accordance with the present invention.

FIG. 3 depicts one application of the weight sensing apparatus of the present invention. The output of weight sensor system 22 is applied to vehicular air bag controller 24a which controls the deployment of an air bag 48 within a vehicle. When impact sensor 50 senses that the vehicle has received an impact, the impact sensor applies an output to air bag controller 24a to initiate deployment of air bag 48. Air bag 48 is positioned to provide protection to a passenger seated in a seat of the vehicle adjacent the air bag. The two-position sensitive switches 28 of the weight sensor system 22 are mounted in that vehicle seat to sense the weight of a passenger seated in that seat. Air bag controller 24a adjusts the inflation rate and/or inflation level of the air bag in accordance with the sensed passenger weight.

Figure 4:
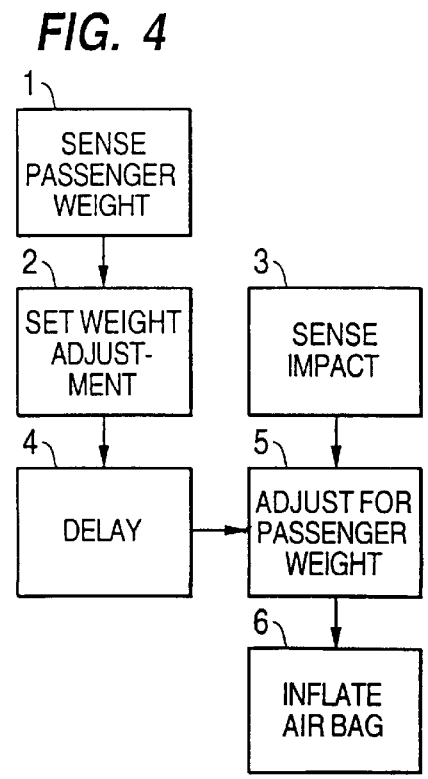
FIG. 4 is a flow chart of the operation of the air bag system of FIG. 3 in accordance with one embodiment of the present invention.

FIG. 4 is a flow chart illustrating the operation of air bag controller 24a. In step 1, the weight of a passenger seated in the seat to be protected by the air bag is sensed. By way of example, this sensing might be done by air bag controller 24a periodically applying a voltage to each of lines 32–36 and sensing each of lines 38–46 to determine which of the switches 28-1 through 28-15 has changed position. In step 2 an adjustment of the air bag deployment is set based on the sensed weight. If an impact is sensed in step 3, then after a delay in step 4, the weight adjustment that has been set in step 2 is utilized in step 5 to adjust the air bag deployment in accordance with the sensed passenger weight. Then in step 6 the air bag is inflated.

Figure 5:
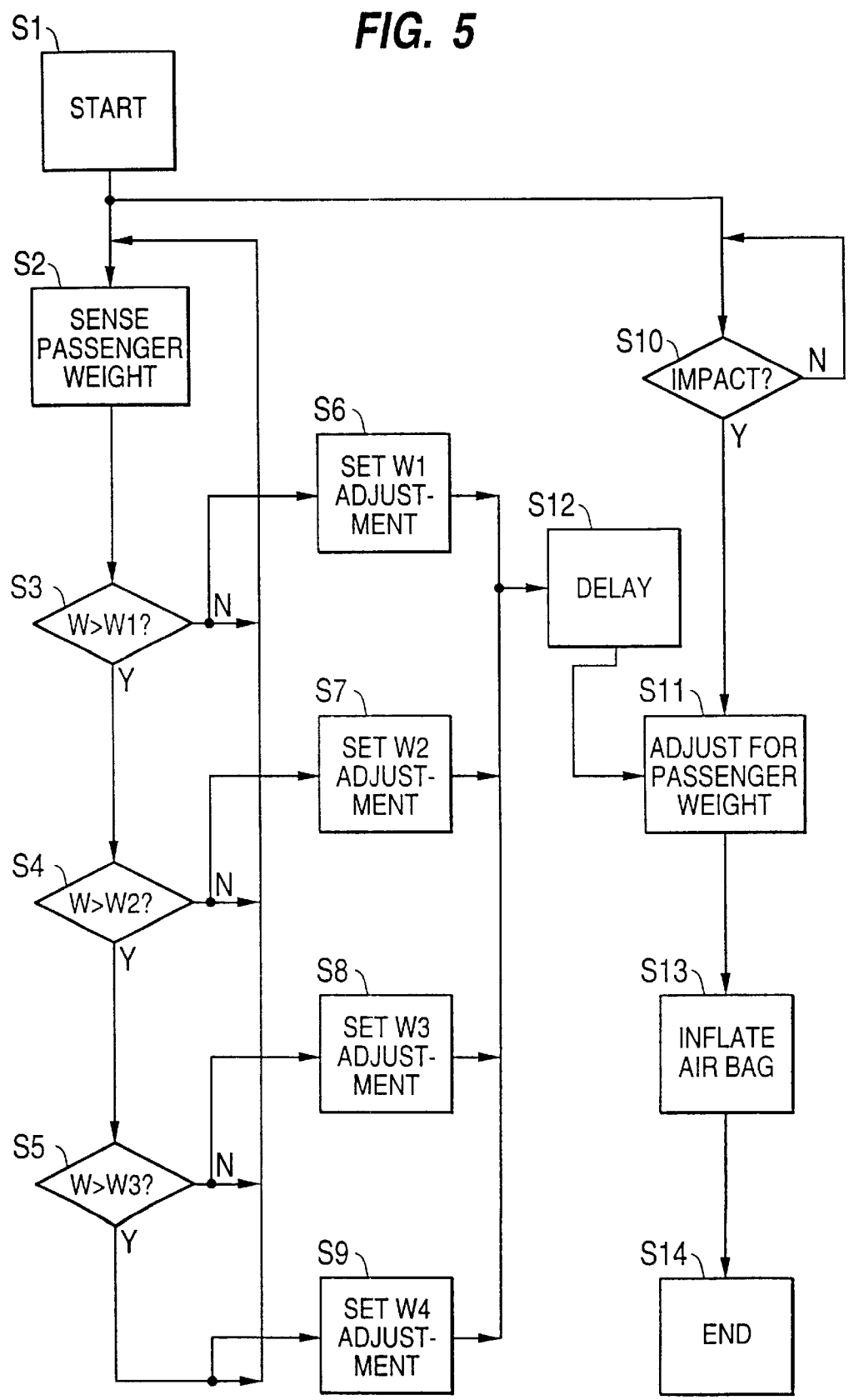
FIG. 5 is a flow chart of the operation of the air bag system of FIG. 1 in accordance with another embodiment of the present invention.

FIG. 5 is a flow chart illustrating the operation of an air bag controller 24a which incorporates a central processing unit (CPU). When the vehicle is started, the air bag controller starts its operation in step S1. The weight sensor system 22 senses the passenger weight in step S2. In step S3 the system determines whether the sensed weight is greater than a first weight W1. If the sensed weight is greater than the weight W1, then in step S4 it is determined whether the sensed weight is greater than a second weight W2. If the sensed weight is greater than the weight W2, then in step S5 it is determined whether the sensed weight is greater than a third weight W3. In step S3, if the sensed weight is less than weight W1, then the flow returns to step S2 to repeat the cycle, and in step S6 an adjustment level W1, appropriate for weights up to weight W1, is set. Similarly, if in step S4 the sensed weight is less than weight W2, then the flow returns to step S2, and in step S7 an adjustment level W2 is set that is appropriate for weights up to weight W2. Likewise, if in step S5 the sensed weight is less than weight W3, the flow returns to step S2, and in step S8 an adjustment level W3, appropriate for weights up to weight W3, is set. On the other hand, if in step S5 the sensed weight exceeds weight W3, then in step S9 the flow returns to step S2, and an adjustment level W4, appropriate for weights greater than weight W3 is set.

Following start up of the system in step S1, the flow determines in step S10 whether impact sensor 50 has sensed an impact. If not, step S10 is repeated. If an impact is sensed in step S10, then the flow advances to step S11 to adjust the air bag deployment. The level W1–W4 adjustment that was set in the activated one of the steps S6–S9 passes through a brief delay in step S12 to specify the adjustment level for the passenger weight that is to be set in step S11. Following this adjustment, the flow moves to step S13 to inflate the air bag, after which the flow ends in step S14.

An impact might result in a passenger being pushed backward in the passenger seat due to inertia. This could result in weight sensor system 22 sensing a weight greater than the actual passenger weight. The delay of step S12 prevents such an erroneous reading from causing an improper adjustment of the air bag inflation. This delay might be in the order of one second or less, since the air bag generally deploys in less time than that following sensing of an impact.

Figure 5A:
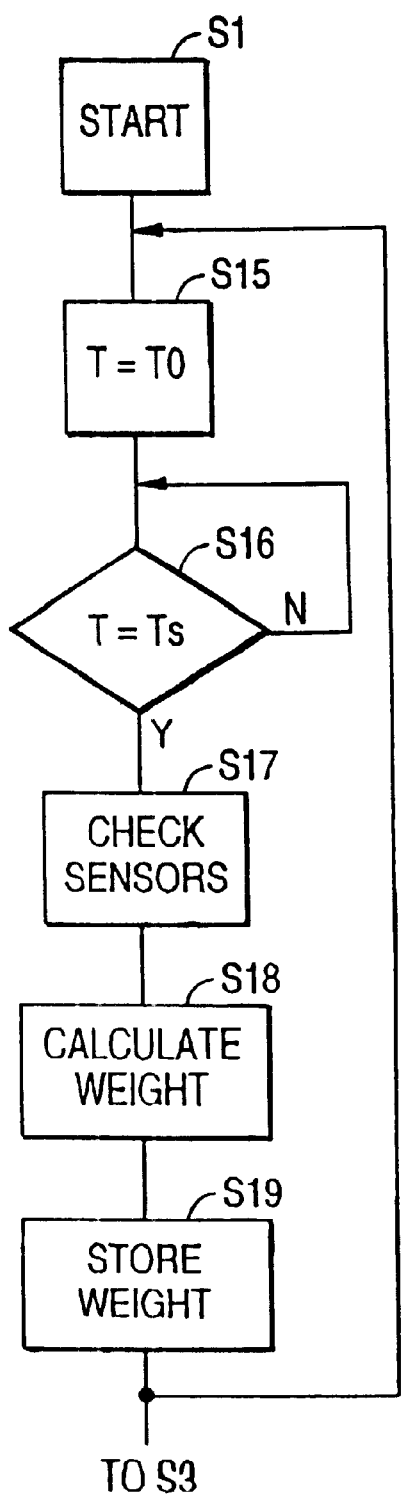
FIG. 5A is a more detailed flow chart of one implementation of step S2 of the flow chart of FIG. 5.

FIG. 5A is a more detailed flow chart of one implementation of step S2 from FIG. 5, in which the passenger weight is sensed. When the process is started in step S1, the time T is set to T0 in step S15. Then in step S16 it is determined whether the time T has reached the time Ts when the sensors are to be checked. If not, step S16 is repeated. If the time T=Ts, then in step S17 the sensors are checked, and in step S18 the weight is calculated. The calculated weight can be stored in a memory in step S19, if desired, following which the weight sensing process is repeated commencing with step S15, and the air bag control process continues with step S3 of FIG. 5. Alternatively, the flow can repeat with step S15 to step S3 directly from step S18 without storage in memory.

In step S17, the sensors can be checked in any of various ways. If dome shaped switches of the type shown in U.S. Pat. No. 5,563,458 are utilized, step S17 can comprise applying a current to the array of sensors and determining which sensors have responded to the weight by switching to their second position, as described above.

Figure 6:
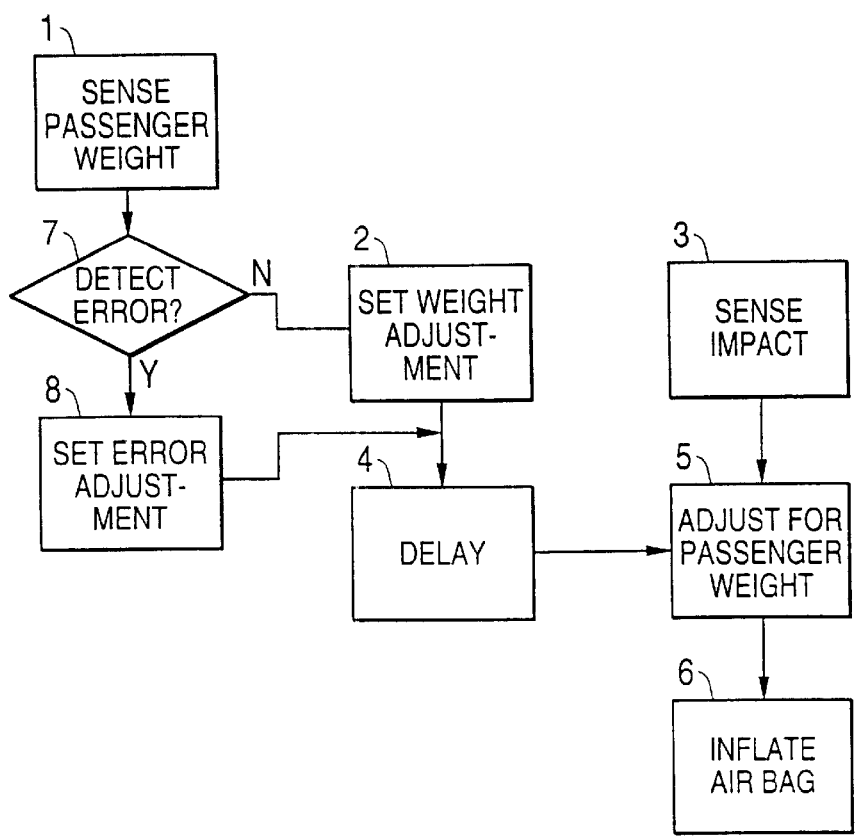
FIG. 6 is a flow chart of the operation of the air bag system of FIG. 1 in accordance with a further embodiment of the present invention.

If desired, an error check can be incorporated into the system. Thus, for example, if step S3 of the flow chart of FIG. 5 indicates that the sensed weight is greater than weight W1 but less than weight W2, so that step S7 should set the W2 adjustment level, but also step S5 indicates that the weight is greater than weight W3, so that step S9 should set the W4 adjustment level, an error has occurred. FIG. 6 is a flow chart of a process including the setting of an error adjustment upon such occurrence. In step 1 the passenger weight is sensed. In step 7, it is determined whether an error has been detected. If no error is detected, then the flow proceeds to step 2 and continues as in the flow of FIG. 4. However, if an error is detected in step 7, then in step 8 an error adjustment level is set, rather than a weight adjustment. This error adjustment is delayed in step 4 and used to adjust the deployment of the air bag in step 5, in place of the weight adjustment of step 2.

Figure 7:
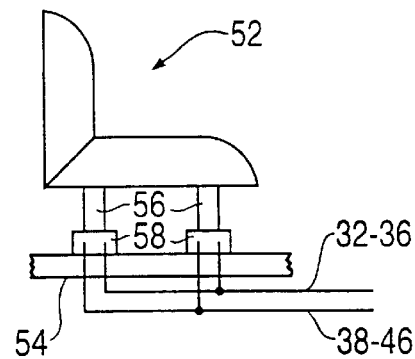
FIG. 7 is a schematic representation of one embodiment of a vehicular passenger seat, including weight sensors, which is suitable for incorporation into a vehicular air bag system in accordance with the present invention.

FIG. 7 illustrates a preferred mounting of the two-position force sensitive switches into the vehicle seat. The vehicle seat 52 is mounted to vehicle floor or frame members 54, only one of which is depicted in FIG. 7, by seat mounts 56. A group of two-position force sensitive switches 58 is mounted in each seat mounting member 56 to sense the weight of the seat and passenger.

Figure 8:
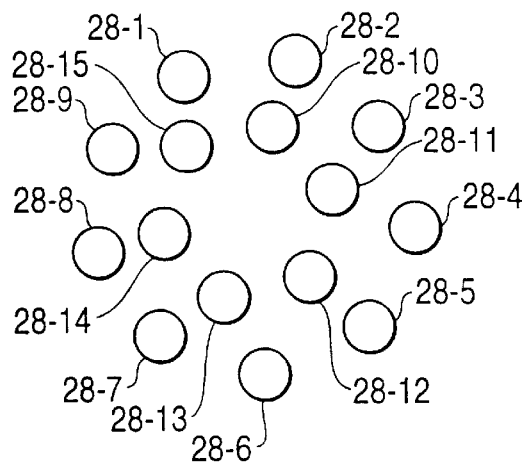
FIG. 8 is a plan view of a group of two-position switches suitable for sensing the weight of an object in accordance with the present invention.

FIG. 8 depicts one illustrative manner in which the two-position force sensitive switches 28 can be physically positioned to sense the weight of an object. In this illustrative example, the fifteen switches 28-1 through 28-15 of the switch array of FIG. 2 are physically positioned in two concentric circles. Each circle can contain a mixture of switches of different force sensitivities or switches of identical force sensitivities, depending upon the particular application. A physical layout of an array such as this might be used in each group 58 of switches within the mounting members 56 of passenger seat 52, each group then having a form like a washer inserted between the seat and the floor or frame member. Of course, other physical layouts could alternatively be used.

Figure 9:
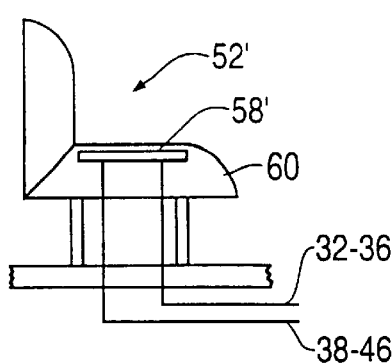
FIG. 9 is a schematic representation of another embodiment of a vehicular passenger seat, including weight sensors, which is suitable for incorporation into a vehicular air bag system in accordance with the present invention.

As illustrated in FIG. 9, rather than in the mounting members 56 of seat 52, the group 58' of two-position force sensitive switches could be mounted within the seat cushion 60 of seat 52'. Mounting of the switches in the seat mounting members 56 is preferably however, due to ease of access to the switches in the event servicing or replacement of the switches is necessary.

U.S. Pat. No. 5,563,458 discloses an array of dome shaped switches included in a flexible surface material. The switches respond to flexing of the material to move from one switch position to the other. This could be incorporated into the seat cushion 60 with flexing caused by force due to the weight of the seat occupant.

The restraining force which a vehicular air bag exerts on a passenger seated in an adjacent seat is to an extent dependent upon the distance of the passenger from the air bag storage position at the time of impact. This distance is dependent, in part, on the distance of the seat from the air bag storage position. Many seats in automobiles and trucks are movable to permit the occupant to adjust the seat position. If the passenger moves the seat closer to the front of the vehicle, that likely moves the passenger closer to the stored air bag. Such forward movement is more likely by a shorter or smaller passenger, particularly the driver of the vehicle. Consequently, the danger of injury to the passenger by the deploying air bag is increased not only due to the small size of the passenger, but also due to the closeness of the passenger's seated position.

Further, the passenger might change his or her seated position within the seat, sometime sitting back in the seat, and other times sitting forward near the edge of the seat. This also varies the distance from the passenger to the air bag at the time of air bag deployment.

Figure 10:
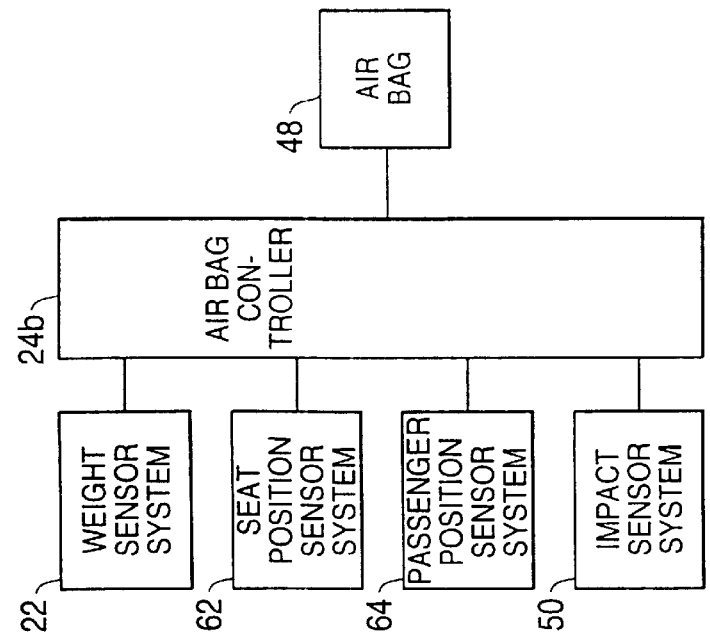
FIG. 10 is a block diagram of a second embodiment of a vehicular air bag system in accordance with the present invention.

FIG. 10 is a block diagram of an air bag system including an air bag controller 24b which receives inputs not only from weight sensor system 22 and impact sensor system 50, but also from a seat position sensor system 62 and a passenger position sensor system 64. By way of examples, the seat position sensor system 62 might include a number of micro switches, optical detectors, or other position sensing devices. Likewise by way of example, passenger position sensor system 64 can include the two-position force sensitive switches 28, with decoder 30 or air bag controller 24b determining the physical location of the switches 28 that have switched to their high weight range position.

Figure 11:
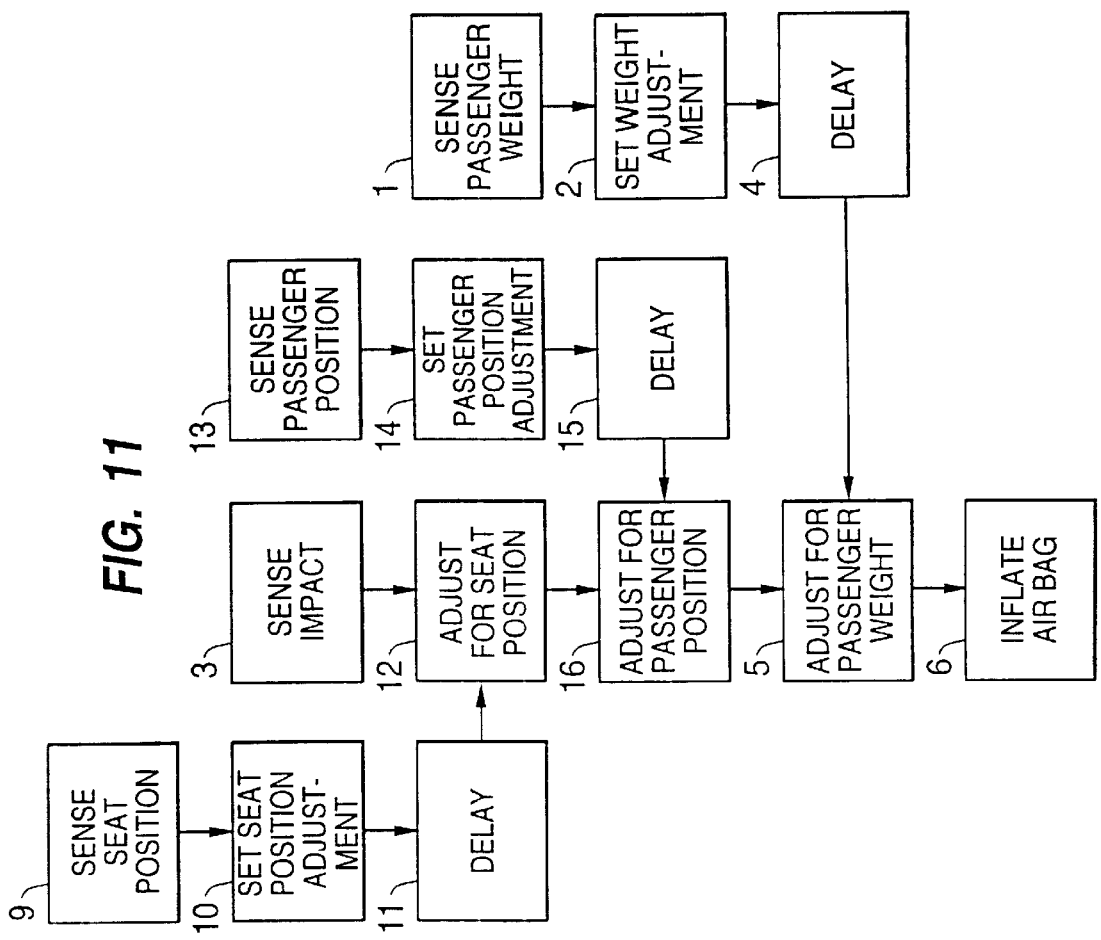
FIG. 11 is a flow chart of the operation of the air bag system of FIG. 10 in accordance with an embodiment of the present invention.

FIG. 11 is a flow chart of the operation of the air bag system of FIG. 10. When the vehicle operation commences, the seat position is sensed in step 9, and a seat position adjustment is set in step 10. Likewise, the passenger position on the seat is sensed in step 13, and a passenger position adjustment is set in step 14. Upon sensing of an impact in step 3, a seat position adjustment is made in step 12, after the delay of step 11, and a passenger position adjustment is made in step 16 after the delay of step 15. The passenger weight is sensed in step 1, a weight adjustment is set in step 2, and after the delay of step 4, an adjustment for the passenger weight is made in step 5, just as in the flow chart of FIG. 4. With the adjustments of steps 12, 16, and 5, and any of the adjustments built into the system, the air bag is inflated in step 6. The sequence of the adjustments could be changed, if desired, of course.

The weight ranges which the two-position force sensitive switches 28 detect can be set as desired. The ranges might indicate no or very low weight, low weight, medium weight, and high weight. In a passenger vehicle, for example, the weight limit W1 of step S3 in the flow chart of FIG. 5 might be 50 pounds, while the weight limit W2 might be 100 pounds, and the weight limit W3 150 pounds. Thus, if there is no passenger or if the passenger weighs 50 pounds of less, then a first weight adjustment level W1 is set in step S6, while if the passenger weighs between 50 and 100 pounds, a second weight adjustment level W2 is set in step S7. Similarly, if the passenger weighs between 100 and 150 pounds, then a third weight adjustment level W3 is set in step S8, and if the passenger weighs more than 150 pounds, then a fourth weight adjustment level W4 is set in step S9. Other ranges or another number of ranges could be utilized. Inflation of the air bag is controlled according to the sensed weight, and weight adjustment level W1 might result in completely inhibiting inflation of the air bag.

Similar levels of adjustment can be set for the seat position sensed by seat position sensor system 62 and for the passenger position set by passenger position sensor system 64. Likewise, either of those systems could incorporate error detection as in step 7 of the flow chart of FIG. 6.

Step 5 of FIGS. 4 and 6, step S11 of FIG. 5, and steps 5, 12, and 16 of FIG. 11 adjust the air bag deployment in accordance with the sensed parameters. If the air bag deployment system includes a solid fuel to be oxidized upon sensing of an impact so as to generate a gas to inflate the air bag, then these steps might adjust the quantity of the solid fuel. If the air bag deployment system includes release of a pressurized gas from a container of such gas, then these steps might control the quantity of the gas that is released or the rate at which the gas is released, for example, by controlling a valve.

It is thus seen that the present invention provide an apparatus for sensing the weight of an object and providing a digital representation of a weight range within which the sensed weight falls. In addition, the present invention provides a vehicular air bag system in which the air bag deployment is controlled in accordance with the passenger's weight, and also, if desired, the passenger's position relative to the air bag. Although the present invention has been described with reference to preferred embodiments, various rearrangements, alterations, and substitutions can be made, and still the result will come within the scope of the invention.

What is claimed is:

1. Apparatus for sensing the weight of an object and providing a digital representation of a weight range within which the sensed weight falls, said apparatus comprising:

a plurality of groups of two-position switches, each switch normally assuming a first position in which such switch provides a first output signal indicative of the first position, each switch of a first one of said groups being responsive to a force of at least a first predetermined amount to assume a second position in which such switch provides a second output signal indicative of the second position, each switch of a second one of said groups being responsive to a force of a second predetermined amount, different from the first predetermined amount, to assume the second position in which such switch provide a second output signal indicative of the second position, the first position for each group representing a first weight range for such group, and the second position for each group representing a second weight range for such group, causing each group of switches to provide the first output signal to indicate a first weight range uniquely associated with the first group of switches and to provide the second output signal to indicate a second weight range uniquely associated with the second group of switches;

a support surface overlying said switches, for supporting an object to be weighed;

a decoding circuit for monitoring the output signal from each of said two-position switches to provide a digital representation of the weight range within which the weight of the object falls.

2. Apparatus as claimed in claim 1, further comprising an indicator for providing an indication of the represented weight range.

3. Apparatus as claimed in claim 1, further comprising a controller for controlling a process in accordance with the represented weight range.

4. Apparatus as claimed in claim 3, wherein said controller is a vehicular air bag controller for controlling deployment of an air bag in a vehicle.

5. Apparatus as claimed in claim 1, in which said plurality of two-position switches are arranged to represent a two-dimensional array.

6. Apparatus as claimed in claim 5, in which said plurality of two-position switches are physically positioned in a plurality of concentric circles.

7. Apparatus as claimed in claim 1, wherein each switch of a third one of said groups is responsive to a force of a third predetermined amount, different from the first and second predetermined amounts, to assume the second position in which such switch provides a second output signal indicative of a second position.

8. Apparatus as claimed in claim 1, wherein the number of groups of switches is equal to the number of switches.

9. Apparatus as claimed in claim 1, wherein each group of switches includes a plurality of switches.

10. Apparatus for controlling the deployment of a vehicular air bag in accordance with the weight of a passenger seated in a vehicle passenger seat adjacent the air bag, said apparatus comprising:

an air bag;

an air bag deployment system for deploying said air bag;

an impact sensor for activating said air bag deployment system to deploy said air bag upon sensing of an impact of at least a predetermined magnitude;

a plurality of groups of two-position switches mounted in the passenger seat, each switch normally assuming a first position in which such switch provides a first output signal indicative of the first position, each switch of a first one of said groups being responsive to a force of at least a first predetermined amount to assume a second position in which such switch provides a second output signal indicative of the second position, each switch of a second one of said groups being responsive to a force of a second predetermined amount, different from the first predetermined amount, to assume the second position in which such switch provides a second output signal indicative of the second position, the first position for each group representing a first weight range for such group, and the second position for each group representing a second weight range for such group, causing each group of switches to provide the first output signal to indicate a first weight range uniquely associated with the first group of switches and to provide the second output signal to indicate a second weight range uniquely associated with the second group of switches;

a decoding circuit for monitoring the output signal from each of said two-position switches to provide a digital representation of the weight range within which the weight of a passenger seated in the passenger seat falls; and a controller responsive to said decoding circuit for controlling said air bag deployment system to control deployment of said air bag in accordance with the represented weight range.

11. Apparatus as claimed in claim 10, in which said plurality of two-position switches are arranged to represent a two-dimensional array.

12. Apparatus as claimed in claim 11, in which said plurality of two-position switches are physically positioned in a plurality of concentric circles.

13. Apparatus as claimed in claim 10, in which said two-position switches are positioned in mounting members of the passenger seat.

14. Apparatus as claimed in claim 10, in which said two-position switches are positioned within a seat cushion of the passenger seat.

15. Apparatus as claimed in claim 10, further comprising a position sensor for sensing the position of the passenger seat relative to said air bag; and wherein said controller is further responsive to said position sensor for further controlling said air bag deployment system to control deployment of said air bag in accordance with the sensed passenger seat position.

16. Apparatus as claimed in claim 10, in which said decoding circuit is responsive to an error in the monitored positions to provide an error indication; and said controller is responsive to the error indication in controlling said air bag deployment system.

17. Apparatus as claimed in claim 10, wherein each switch of a third one of said groups is responsive to a force of a third predetermined amount, different from the first and second predetermined amounts, to assume the second position in which such switch provides a second output signal indicative of a second position.

18. Apparatus as claimed in claim 10, wherein the number of groups of switches is equal to the number of switches.

19. Apparatus as claimed in claim 10, wherein each group of switches includes a plurality of switches.

20. In a vehicular air bag system including an air bag, an air bag deployment system for deploying the air bag, and an impact sensor for activating the air bag deployment system to deploy the air bag upon sensing of an impact of at least a predetermined magnitude, an apparatus for controlling the deployment of the air bag in accordance with the weight of a passenger seated in a passenger seat adjacent the air bag, said apparatus comprising:

a plurality of groups of two-position switches mounted in the passenger seat, each switch normally assuming a first position in which such switch provides a first output signal indicative of the first position, each switch of a first one of said groups being responsive to a force of at least a first predetermined amount to assume a second position in which such switch provided a second output signal indicative of the second position, each switch of a second one of said groups being responsive to a force of a second predetermined amount, different from the first predetermined amount, to assume the second position in which such switch provides a second output signal indicative of the second position, the first position for each group representing a first weight range for such group, and the second position for each group representing a second weight range for such group, causing each group of switches to provide the first output signal to indicate a first weight range uniquely associated with the first group of switches and to provide the second output signal to indicate a second weight range uniquely associated with the second group of switches;

a decoding circuit for monitoring the output signal from each of said two-position switches to provide a digital representation of the weight range within which the weight of a passenger seated in the passenger seat falls; and a controller responsive to said decoding circuit for controlling said air bag deployment system to control deployment of said air bag in accordance with the represented weight range.

21. Apparatus as claimed in claim 20, in which said plurality of two-position switches are arranged to represent a two-dimensional array.

22. Apparatus as claimed in claim 21, in which said plurality of two-position switches are physically positioned in a plurality of concentric circles.

23. Apparatus as claimed in claim 20, in which said two-position switches are positioned in mounting members of the passenger seat.

24. Apparatus as claimed in claim 20, in which said two-position switches are positioned within a seat cushion of the passenger seat.

25. Apparatus as claimed in claim 20, further comprising a position sensor for sensing the position of the passenger seat relative to the air bag; and wherein said controller is further responsive to said position sensor for further controlling the air bag deployment system to control deployment of the air bag in accordance with the sensed passenger seat position.

26. Apparatus as claimed in claim 20, in which said decoding circuit is responsive to an error in the monitored positions to provide an error indication; and said controller is responsive to the error indication in controlling the air bag deployment system.

27. Apparatus as claimed in claim 20, wherein each switch of a third one of said groups is responsive to a force of a third predetermined amount, different from the first and second predetermined amounts, to assume the second position in which such switch provides a second output signal indicative of a second position.

28. Apparatus as claimed in claim 20, wherein the number of groups of switches is equal to the number of switches.

29. Apparatus as claimed in claim 20, wherein each group of switches includes a plurality of switches.

\* \* \* \* \*